US008726319B2

(12) United States Patent
Roberts et al.

(10) Patent No.: US 8,726,319 B2
(45) Date of Patent: May 13, 2014

(54) APPARATUS FOR CONNECTING MULTIPLE DISEQC TO SATELLITE RECEPTION DEVICES IN A VIDEO DISTRIBUTION SYSTEM

(75) Inventors: Harold Gene Roberts, Carmel, IN (US); Clint Alan Ecoff, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 903 days.

(21) Appl. No.: 11/596,909

(22) PCT Filed: May 19, 2005

(86) PCT No.: PCT/US2005/017706

§ 371 (c)(1),
(2), (4) Date: Nov. 17, 2006

(87) PCT Pub. No.: WO2005/114879

PCT Pub. Date: Dec. 1, 2005

(65) Prior Publication Data

US 2007/0242633 A1 Oct. 18, 2007

Related U.S. Application Data

(60) Provisional application No. 60/572,924, filed on May 20, 2004.

(51) Int. Cl.
*H04N 7/20* (2006.01)

(52) U.S. Cl.
USPC .......... 725/71

(58) Field of Classification Search
USPC .......... 725/71
See application file for complete search history.

(56) References Cited

U.S. PATENT DOCUMENTS

| | | | | |
|---|---|---|---|---|
| 5,555,543 | A * | 9/1996 | Grohoski et al. | 709/209 |
| 5,581,709 | A * | 12/1996 | Ito et al. | 710/38 |
| 6,098,110 | A * | 8/2000 | Witkowski et al. | 709/249 |
| 2006/0041912 | A1* | 2/2006 | Kuhns | 725/71 |

FOREIGN PATENT DOCUMENTS

| | | |
|---|---|---|
| EP | 1009113 | 12/1998 |
| EP | 0936763 | 8/1999 |

(Continued)

OTHER PUBLICATIONS

European Telecommunications Satellite Organization, Paris, France,"Digital Satellite Equipment Control (DisEqC), Bus Functional Specification; version 4.2", Feb. 25, 1998, XP002348247.

(Continued)

*Primary Examiner* — Nathan Flynn
*Assistant Examiner* — Alfonso Castro
(74) *Attorney, Agent, or Firm* — Robert D. Shedd; Brian J. Cromarty

(57) ABSTRACT

A bridge is provided for connecting multiple satellite receivers to multiple accessories in a video distribution system such as a direct broadcast satellite system. The bridge is designed for interposition between multiple satellite receivers (set top boxes or STBs) and controllable accessories (e.g. LNBs or multi-switches) of the video distribution system. The bridge provides controlled communication between STBs and controllable accessories using, for example, customized vendor extensions to the DiSEqC communication protocol. The bridge includes a communication protocol transceiver for each STB port, a communication protocol transmitter for each controllable accessory port, a mailbox for each STB port, a mailbox for the bridge, and a controller, processor, processing means or processing logic controlling or regulating video distribution system communication.

9 Claims, 3 Drawing Sheets

(56) References Cited

FOREIGN PATENT DOCUMENTS

| | | | |
|---|---|---|---|
| FR | 2861939 | 5/2005 | |
| GB | 2377111 | 12/2002 | |
| GB | 2377111 A | * 12/2002 | ............... H04N 7/16 |
| WO | WO2004038965 | 5/2004 | |

OTHER PUBLICATIONS

Hofmeir, S: "SISEQC MIT NEUEM Level", Funkschau, Weka-Fachzeitschr. Verlag, Poing, DE, vol. 71, No. 14, pp. 64-65, Jun. 22, 1998, XP000869068.

Kriebel, H: "Digitales Schaltkonzept Fuer SAT-ANLAGEN", Funkschau, Weka Fachzeitschriften Verlag, Poing, DE, vol. 67, No. 22, pp. 58-59, Oct. 13, 1995, XP000536512.

Kriebel, K: "SAT-ANLAGEN Intelligent Steuem: DiSEqC", Radio Femsehen Elektronik, Verlag Technik, Berlin, DE, vol. 45, No. 1, pp. 45-47, Jan. 1996, XP000583401.

RFE Radio Fernsehen Elektronik, Huss Medien GmBh, Berlin, DE,"3 Signalverteilung in Mehrfamilien-haeusem. Durchgesetzt Haben Sich Die SAT-Aufbereitung Und Die SAT-ZF-Verteilung Und DiSEqC Fuer Denmehrsatellitenempfang" vol. 47, No. 6, pp. 58-59, 1998, X.

* cited by examiner

APPARATUS FOR CONNECTING MULTIPLE DISEQC TO SATELLITE RECEPTION DEVICES IN A VIDEO DISTRIBUTION SYSTEM

CROSS-REFERENCE TO RELATED APPLICATIONS

This application claims the benefit, under 35 U.S.C. §365 of International Application PCT/US2005/017706, filed May 19, 2005, which was published in accordance with PCT Article 21(2) on Dec. 1, 2005, in English, which claims the benefit of U.S. Provisional Patent Application No. 60/572,924, filed May 20, 2004.

FIELD OF THE INVENTION

The invention relates generally to video distribution systems and, in particular, the invention relates to a video distribution system device that provides coupling of and communication between video distribution system components.

BACKGROUND OF THE INVENTION

In the past, most locations such as homes had at most one set top box (STB). A location having multiple STBs was considered rare. Today though, more locations such as households have two or more STBs sharing the same digital broadcast satellite (DBS) video service. In video-distribution systems for multiple reception locations such as multiple-dwelling units, multiple-tenant units, hospitality market (e.g., hotels), and planned communities, there is often a miniature "headend" to receive the video signal (e.g., a direct broadcast satellite (DBS) or terrestrial broadcast) and then distribute the signal throughout the premises. The DBS and/or terrestrial antennas, amplifiers, bridges, set-top boxes (STBs), and other video equipment may communicate in a limited manner.

One communication protocol that is used in video distribution systems or is provided as part of a video distribution system component is the Digital Satellite Equipment Control (DiSEqC) protocol (DiSEqC being a trademark of Eutelsat, the European Telecommunications Satellite Organization). A DiSEqC system is a communication bus particularly used between satellite receivers and satellite peripheral equipment (e.g. multi-switches, LNBs), using coaxial cable as the network media. DiSEqC can be integrated into consumer satellite installations and replace conventional analog (voltage, tone or pulse width) switching and other control wiring between devices.

DiSEqC, as defined by Eutelsat, is a single master, single or multiple slave system. The DiSEqC protocol was designed for applications where there is one bus "master" and all other DiSEqC-compatible devices in the system are considered DiSEqC "slaves". With the DiSEqC protocol, only a DiSEqC master device may initiate communication. A DiSEqC slave will reply, if defined by the DiSEqC command it received, to the DiSEqC master, but the DiSEqC slave, however, cannot initiate communication. Thus, communications can be initiated only by the DiSEqC master device. The DiSEqC master device is typically an integrated receiver device (IRD); also known as a set-top box (STB).

A traditional DiSEqC system cannot support multiple STBs because each STB would be considered a DiSEqC "master". Currently, because of such constraints, each STB is wired as a separate DiSEqC system to its associated LNB. DiSEqC communication between STBs is thus not possible because each STB would want to act as a DiSEqC master. (see DiSEqC Bus Functional Specification", version 4.2, European Telecommunications Satellite Organization, Feb. 25, 1998). Applications have thus been encountered where it would be advantageous for multiple STBs within a video distribution system to function as DiSEqC "masters".

The typical consumer now has more that one television. As such, direct broadcast satellite (DBS) systems are offered that includes multiple satellite receivers or set-top boxes, one for each television. Because such video distribution systems cannot support multiple STB master devices, the multiple STBs are each activated without regard to any other STB. This permits an STB to be moved to another location outside of the original video distribution system. In this manner non-subscribers may receive satellite television through another video distribution system. This presents a theft of service problem regarding such video distribution systems.

It is evident from the above that there is a need to address multiple STB video distribution systems.

It is thus evident from the above that there is a need to provide for multiple master devices in a direct broadcast satellite video distribution system.

It is also evident from the above that there is a need for a DiSEqC compatible video distribution system that allows for more than one DiSEqC master device.

SUMMARY OF THE INVENTION

A communication and/or coupling device is provided for connecting multiple set top boxes (STBs) to multiple video reception devices in a direct broadcast satellite system (DBS). The communication device is designed for interposition between multiple STBs and controllable video reception devices of the video distribution system. The communication device provides controlled communication between the STBs and the controllable video reception devices using an extension of a video distribution system communication protocol. The device includes a communication protocol transceiver for each STB port, a communication protocol transmitter for each controllable video reception device port, a mailbox for each STB port, a mailbox for the communication device, and a controller, processor, processing means and/or processing logic controlling and/or regulating communication.

In one form, there is provided a connection device for a video distribution system. The connection device includes a first plurality of input/output ports each one of which is configured to be coupled with a set top box, a second plurality of input/output ports each one of which is configured to be coupled with a controllable video reception device, a communication protocol transceiver associated with each one of the first plurality of input/output ports, a communication protocol transmitter associated with each one of the second plurality of input/output ports, and a controller in communication with each communication protocol transmitter and each communication protocol transceiver, the controller providing i) one to one communication between the first plurality of input/output ports and the second plurality of input/output ports, and ii) intercommunication between the first plurality of input/output ports.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
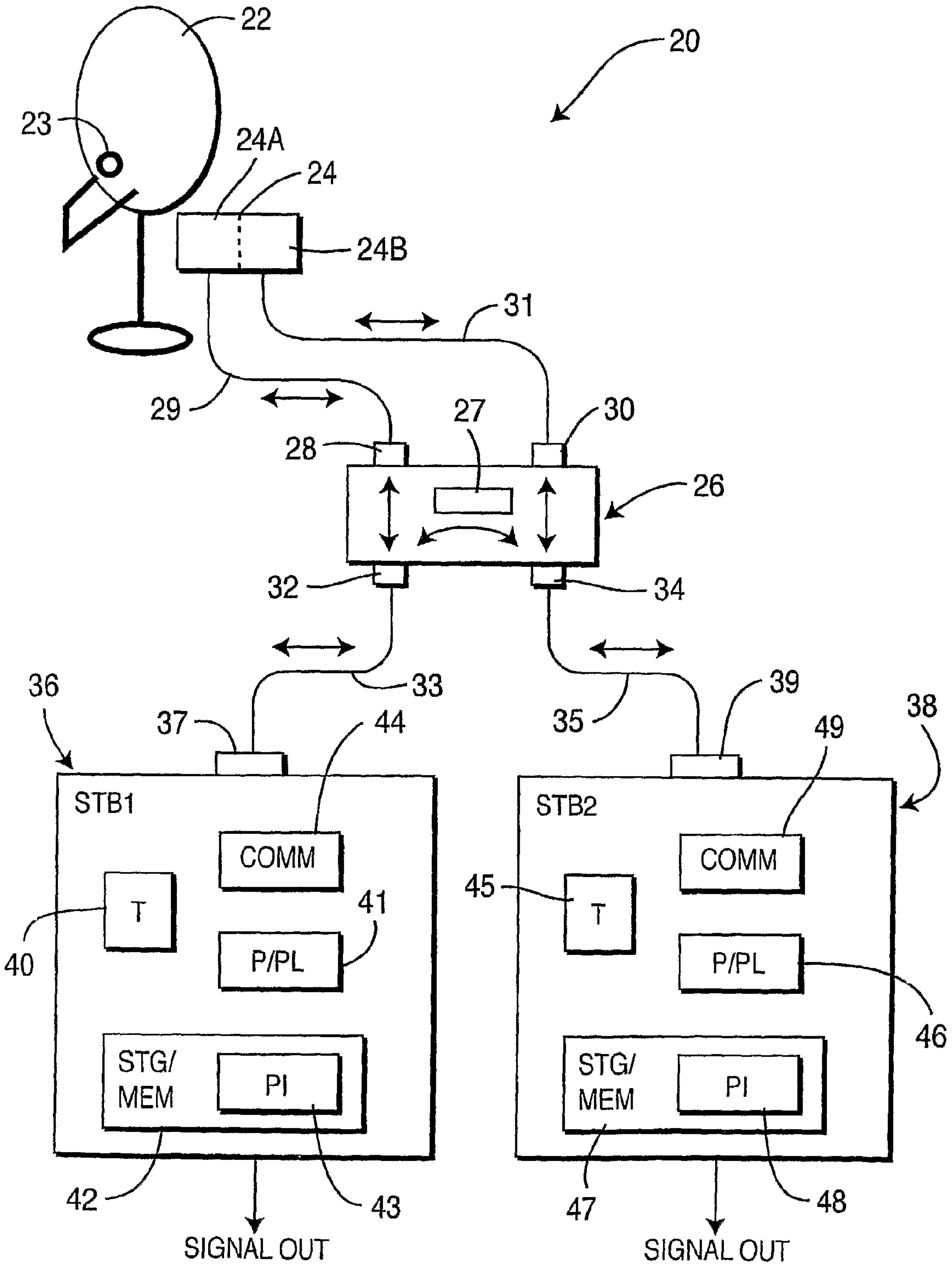
FIG. 1 depicts an exemplary video distribution system incorporating the principles of the present invention.

Corresponding reference characters indicate corresponding parts throughout the several views. Although the drawings represent embodiments of the invention, the drawings are not necessarily to scale and certain features may be exaggerated in order to better illustrate and explain the invention. The exemplifications set out herein illustrate embodiments of the invention, but such exemplifications are not to be construed as limiting the scope of the invention in any manner.

DETAILED DESCRIPTION

The embodiments disclosed herein are not intended to be exhaustive or limit the invention to the precise form disclosed so that others skilled in the art may utilize its teaching.

FIG. 1 depicts a video distribution system (VDS 20) utilizing and employing the principles of the present invention. While VDS 20 of FIG. 1 is of a particular configuration, it should be appreciated that VDS 20 represents the numerous types of systems and/or configurations thereof that can utilize the present principles. Also, it should be appreciated that FIG. 1 is representational only and as such is not to scale nor necessarily to scale relative to its own components.

VDS 20 includes antenna or signal receiver 22 that is configured, adapted and/or operable to receive video signals (e.g. television signals) from a satellite (not shown). It should be appreciated that the antenna 22 represents the numerous types of antennas or signal receivers (e.g. a headend) that may be used in a VDS along with the present invention, the type of which is generally determined by the source of the signal. As such, the signal source may other than a satellite. The antenna 22 is shown with a signal transducer (e.g. feed horn) 23 that receives transmitted or broadcast video signals and transmits the received video signals to a dual or twin Low Noise Block down-converter (LNB) 24.

LNB 24 includes first and second LNBs 24A and 24B (or LNB A and LNB B). Each LNB 24A and 24B is configured, adapted and/or operable such as is known in the art to downconvert the received video signals. LNB 24 may optionally amplify and/or otherwise condition the received signals. While two LNBs are shown, it should be appreciated that the LNB may consist of any number of LNBs. Moreover, it should be appreciated that LNB 24 represents other types of signal reception/conditioning devices that may be used in a VDS.

LNB 24 is also a controllable device that receives commands and provides data and/or implements the command(s) as appropriate. As such, LNB 24 utilizes a communication protocol to effect such functionality. A preferred communication protocol is DiSEqC, but other communication protocols could be utilized. Hereinafter, DiSEqC will be used when referring to the communication protocol for all components or devices of VDS 20 since an implementation of the present principles is presented herein using the DiSEqC protocol. It should be appreciated that the LNBs 24 also represent various types of controllable video distribution devices, video reception devices or video distribution system accessories (simply, accessories) such as multi-switches, amplifiers and/or the like.

VDS 20 has two satellite receivers or set-top boxes (STB1) 36 and (STB2) 38. In VDS 20 STBs 36 and 38 are particularly satellite signal receivers, but represent other types of set-top boxes, receivers and/or the like. While only two receivers are shown, a VDS in accordance with and/or incorporating the principles of the present invention, a VDS may have more than two set-top boxes. Set-top boxes 36 and 38 are configured, adapted and/or operable as satellite receivers and thus include the typical functionality as known in the art for satellite receivers. Therefore, each STB 36 and 38 includes components and logic such as is known in the art for providing typical operation of an STB or satellite receiver as well as for the implementation of the present invention. While not a complete depiction and/or description of each component or function of the STB, each STB 36 and 38 is shown as having a tuner 40 or 45, a processor, microprocessor, digital signal processor, processing logic, controller and/or means thereof 41 and 46, memory and/or digital storage 42 and 47, program instructions 43 and 48 for carrying out the functions of the STB and the present invention (e.g. definition and use of extensions to the DiSEqC communication protocol) and communications 44 and 49. Each component is therefore operable, configured and/or adapted to perform in a manner typical for such components and in a manner that implements the present invention.

The number of set-top boxes capable of being in the VDS is preferably equal to the number of LNBs (controllable accessories or video reception devices) capable of being in the VDS. This is because the present invention, according to one aspect thereof, provides one-to-one pairing, coupling and/or communication between an STB and an LNB. Each STB 36 or 38 is DiSEqC compatible and thus incorporates the DiSEqC communication protocol.

According to the principles of the present invention, VDS 20 includes a connection, coupling, communication and/or VDS component pairing (pairing) device 26 also known as (and collectively) a bridge. The bridge 26 includes first and second input ports 28 and 30 and first and second output ports 32 and 34. Input port 28 is connected via coaxial cable (coax) or other communication medium 29 to one (LNB A or 24A) of the two LNBs of the twin LNB 24. Input port 30 is connected via coaxial cable (coax) or other communication medium 31 to the other (LNB B or 24B) of the two LNBs of the twin LNB 24. Output port 32 of the bridge 26 is connected via coaxial cable (coax) or other communication medium 33 to an input/output port 37 of STB1 (36). Output port 34 of the bridge 26 is connected via coaxial cable (coax) or other communication medium 35 to an input/output port 39 of STB2 (38). The bridge 26 is thus interposed between the LNB 24 and the STBs 36 and 38. The STBs 36 and 38 are in communication with the twin LNB 24 via the bridge 26. As represented by the various arrows associated with VDS 20, the bridge 26 allows communication between STBs 36 and 38 (inter-STB communication or two-way communication since an STB can initiate commands and provide replies), and communication between an STB 36 and 38 and one of the LNBs of the dual LNBs 24 (one-to-one or one-way communication since an LNB, being a slave device, can only provide replies to commands from the STB).

The bridge 26 includes a microprocessor, processor, digital signal processor, processing logic, controller and/or means thereof 27 including storage, memory, program instructions, mailboxes, buffers and/or the like for functional operation of the bridge 26 in the manner described herein. The bridge 26 is configured, adapted and/or operable to pair an STB with an LNB. This is illustrated in FIG. 1 by the vertical double-headed arrows within the bridge 26 and situated between input port 30 and output port 34, and between input port 28 and output port 32. Particularly, the bridge allows STB1 to communicate to, query and control LNB A, and allows STB2 to communicate to, query and control LNB B. Each STB is thus able to send commands to its respective LNB while the LNB is able to provide a reply to the STB through the bridge 26 (one-way communication). The reply may include or be data, a message, or otherwise. The bridge 26 also allows inter-communication between STBs as represented by the curved double-headed arrow within the bridge and situated between output ports 32 and 34. Thus, each STB is able to send commands to any other STB. Each STB is communication protocol enabled and particularly, as indicated above, is DiSEqC enabled and/or compatible. In accordance with the principles of the present invention, each STB also is configured, adapted and/or operable to utilize DiSEqC extensions or bus control commands to communicate with one another and with their respective accessory through the bridge 26. Particularly, through the use of vendor extensions, various commands in the form of a custom communication code provided as vendor extension to DiSEqC. The bridge 26 is capable of accepting, reading, storing, forwarding, transmitting and acting upon the present pairing bridge extensions (as are the STBs).

In order to provide such communication functionality, the bridge 26 implements a buffer, memory or mailbox system. Particularly, the bridge maintains a buffer or mailbox for each STB and the bridge itself. Each buffer or mailbox temporarily stores commands, replies and/or data to be repeated, forwarded or sent to an STB. The bridge 26 also interprets and performs commands as appropriate. In this manner, the bridge 26 controls communication between the various STBs and LNBs.

The bridge repeats any communication protocol (DiSEqC) command received on an STB (bridge output) port to the corresponding LNB or controllable accessory (bridge input) port if the command (address field thereof) is not directed to the bridge or other STB mailbox. The bridge repeats any DiSEqC command received on a controllable accessory port to the associated STB output port.

Functionally, the bridge 26 may be a 2-way or a 4-way STB pairing bridge that supports the present STB pairing functionality, such that the bridge supports one or more STB. The bridge has a one-to-one association between an LNB/multi-switch port and an output port to an STB. In the DiSEqC implementation, the bridge 26 supports DiSEqC 2.0 as modified by the present extensions to support the present STB pairing functionality on the STB output ports of the bridge. The STB pairing bridge also supports DiSEqC 1.0 and 1.1 on the LNB/multi-switch input ports. The following presents exemplary extensions utilizing vendor extensions relative to DiSEqC.

DiSEqC™ Bus Control Commands from the DiSEqC master consist of 3 bytes, plus any ancillary data bytes, all followed by an odd parity check bit. DiSEqC slave Reply messages consist of one byte, plus any ancillary data bytes, all followed by an odd parity check bit. The bits are transmitted as a continuous sequence until the message is complete. The form of a DiSEqC master Command is shown in Table 1.

TABLE 1

| FRAMING | P | ADDRESS | P | COMMAND | P | DATA | P |
|---|---|---|---|---|---|---|---|

The form of a DiSEqC slave Reply is shown in Table 2. A slave replay consists of a framing byte plus any ancillary data bytes, all followed by an odd parity check bit.

TABLE 2

| FRAMING | P | DATA | P | DATA | P |
|---|---|---|---|---|---|

Each STB that supports STB Pairing shall be a DiSEqC "master" for communication to the STB Pairing Bridge. The first byte of the DATA field shall always be a STB Pairing address of an STB, hence this address byte shall have a value between zero and seven.

DiSEqC framing bytes that have been defined are provided in Table 3.

TABLE 3

| Hex Byte | Binary | Framing Byte Function |
|---|---|---|
| E0 | 1110 0000 | Command from DiSEqC master, No reply required, First transmission |
| E1 | 1110 0001 | Command from DiSEqC master, No reply required, Repeated transmission |
| E2 | 1110 0010 | Command from DiSEqC master, Reply required, First transmission |
| E3 | 1110 0011 | Command from DiSEqC master, Reply required, Repeated transmission |
| E4 | 1110 0100 | Reply from DiSEqC slave, "OK", no errors detected |
| E5 | 1110 0101 | Reply from DiSEqC slave, Command not supported by DiSEqC slave |
| E6 | 1110 0110 | Reply from DiSEqC slave, Parity Error detected - Request repeat |
| E7 | 1110 0111 | Reply from DiSEqC slave, Command not recognized - Request repeat |

The address byte is divided into two nibbles of four bits to define a family and sub-type. This is shown in Table 4.

TABLE 4

| FAMILY | SUB-TYPE |
|---|---|

Table 5 provides defined addresses.

TABLE 5

| Hex Byte | Binary | Family and Sub-type |
|---|---|---|
| 00 | 0000 0000 | Any Device (DiSEqC master to all devices) |
| Fx | 1111 bbbb | Reserved for OEM Extensions |
| F0 | 1111 0000 | Any Thomson STB(s) Mailbox and STB Pairing Bridge |
| F1 | 1111 0001 | Thomson STB Pairing Bridge |
| F2 | 1111 0010 | STBPB Mailbox |

The Command Bytes define the actions required of the addressed slave(s). Table 6 below lists extensions to DiSEqC commands. The final column defines the Reply data byte(s) which are expected from an addressed DiSEqC slave in a "two-way" DiSEqC system.

TABLE 6

| Byte Hex. | Command Name | Command Function | Total Trans. Bytes | Reply Data Byte(s) |
|---|---|---|---|---|
| FX | | STB Pairing Functions | | |
| F0 | T-M Auth Reply | Authorization Reply (Write Mail from Master) | 31 | Mailbox Status |
| F1 | T-S1 Auth Req. | Authorization Request (Write Mail from Slave STB) | 31 | Mailbox Status |
| F2 | T-Read Mailbox Status | Read Mailbox Status | 3 | Mailbox Status |
| F3 | T-Read Mail | Read Mail | 4 | Mail |
| F4 | T-Ack Rcv Mail | Acknowledge Received Mail | 4 | Mailbox Status |
| F5 | T-Query Status | Query Status | 3/4 | STBPB Status/Mailbox Status |
| F6 | T-STB Status | STB Status | 13 | Mailbox Status |
| F7 | T-PB Tone On | Switch 22 kHz tone ON for Port | 3 | |
| F8 | T-PB Tone Off | Switch 22 kHz tone OFF for Port | 3 | |
| F9 | T-Phone Connection | Identify IRD with telephone connection | 4 | Mailbox Status |
| FA | TBD | Future Commands | 32 | Mailbox Status |
| FB | T-S Get Premises Address | Get Premises Address | 7 | Premises Address Reply |
| FC | T-M Set Premises Address | Set Premises Address | 8 | Mailbox Status |
| FD | T-M Delete Premises Address | Delete Premises Address | 6 | Mailbox Status |

Reply functions are defined as in Table 7 below.

TABLE 7

| Reply Function | Total Trans. Bytes |
|---|---|
| Premises Address Reply | 2 |
| Mailbox Status Reply | 2 |
| STBPB Status Reply | TBD |
| Mail Reply: Auth Request | 30 |
| Mail Reply: Auth Reply | 30 |
| Mail Reply: Query STB Status | 3 |
| Mail Reply: STB Status | 12 |
| Mail Reply: Allocate Premises Address | 7 |
| Mail Reply: Identify IRD with Telephone Connection | 3 |
| Mail Reply: Delete Premises Address | 6 |

Response form to the Read Mailbox Status Message is presented in Table 8.

TABLE 8

| FRAMING | P | DATA | P |
|---|---|---|---|
| 1110 0100 | P | xxxx xxxx | P |

The Mailbox Status contains individual flag bits to indicate operational conditions of the mailbox associated with the requesting STB. Table 9 presents defined flag bits.

TABLE 9

| Bit Number | Mailbox Function |
|---|---|
| .7 | Slave STB 7 - You have mail (0: No, 1: Yes) (Reserved) |
| .6 | Slave STB 6 - You have mail (0: No, 1: Yes) (Reserved) |
| .5 | Slave STB 5 - You have mail (0: No, 1: Yes) (Reserved) |
| .4 | Slave STB 4 - You have mail (0: No, 1: Yes) (Reserved) |
| .3 | Slave STB 3 - You have mail (0: No, 1: Yes) |
| .2 | Slave STB 2 - You have mail (0: No, 1: Yes) |
| .1 | Slave STB 1 - You have mail (0: No, 1: Yes) |
| .0 | Master STB - You have mail (0: No, 1: Yes) |

The Query Status response contains individual flag bits to indicate operational conditions of the mailbox associated with the requesting STB. This is defined in Table 10 below.

TABLE 10

| Status Byte Number | Description |
|---|---|
| 1-4 | Slave STB address |
| 5-8 | Master Card ID |
| 9 | Active Status (00: Inactive, 01: Active) |

In an exemplary embodiment, the bridge has an input frequency range of 950-2150 MHz and an output frequency range of 0-1 MHz on the LNB connectors to support DiSEqC signaling to the LNB, and an output frequency of 0-1 MHz on the STB connectors to support DiSEqC signaling. The output frequency range on the connectors to the STB is 0-2150 MHz. The bridge 26 makes no assumption regarding STB placement and master/slave addresses. Any slave STB can be connected to any output connector of the bridge, while a master STB may be connected to any output connector of the bridge. Two power modes for the bridge are preferable. The two modes are Standby to minimize power consumption and Operational mode when all functionality is supported. The bridge exits Standby mode when a 22 kHz DiSEqC signal on any connector (port) is detected. While a DiSEqC command received on an STB output port may not be addressed to the STB pairing bridge 26, the command may require the bridge 26 to repeat the command to the associated input port (LNB). The bridge should also support various diagnostics.

Figure 2:
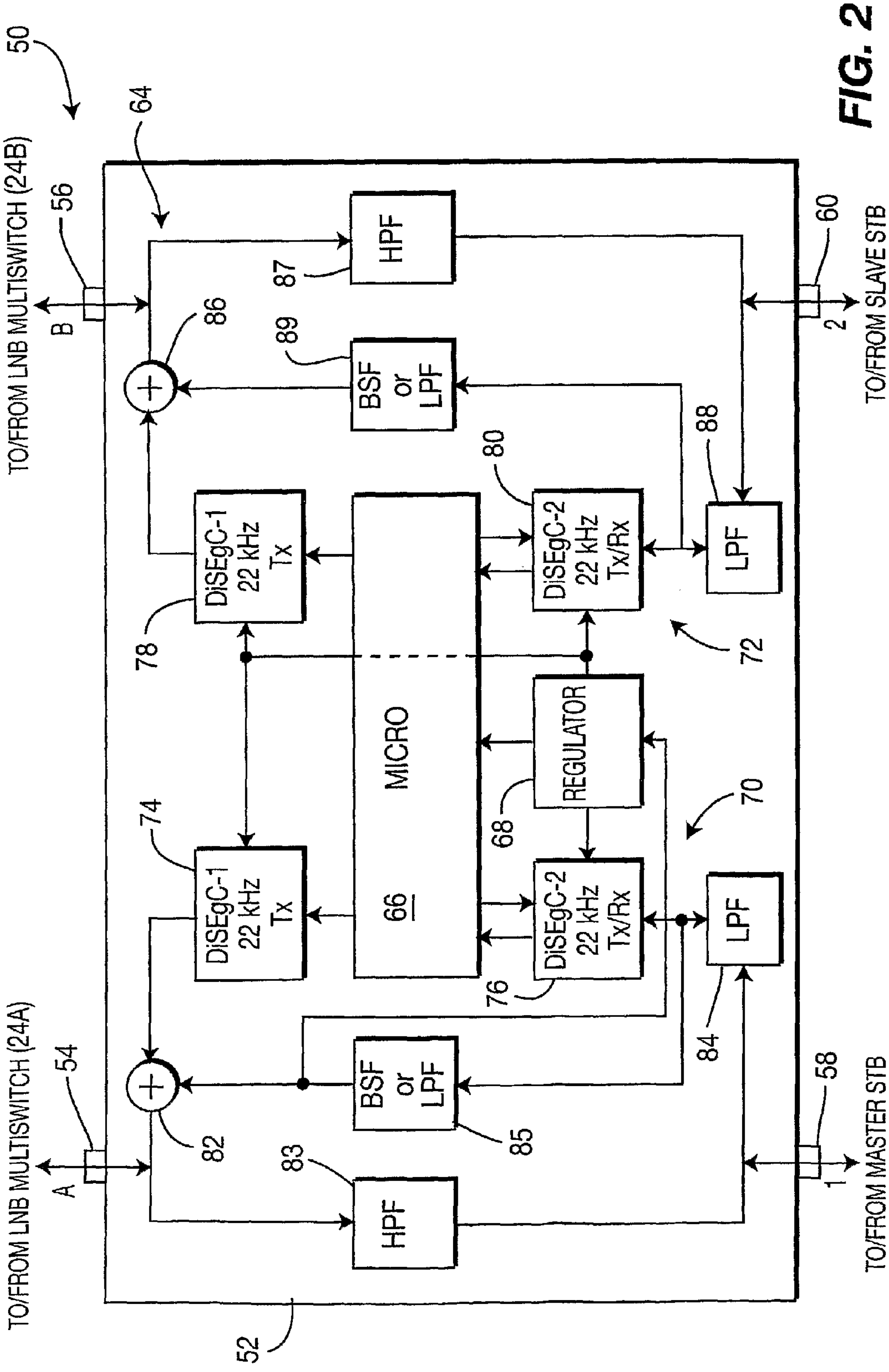
FIG. 2 is a block diagram of an exemplary embodiment of a 2×2 or two channel communication device or bridge for a video distribution system such as that depicted in FIG. 1 in accordance with the principles of the present invention.

Referring to FIG. 2, there is depicted an exemplary two-channel or 2×2 pairing bridge (bridge), generally designated 50, suitable for use as bridge 26 in FIG. 1, and as described herein wherein the STBs and the accessories are DiSEqC compatible or utilize the DiSEqC communication protocol. The bridge 50 has a housing 52 enclosing processing circuitry/logic 64 as well as other components. The bridge 50 is designed to connect to two STBs and two LNBs/multi-switches. The bridge 50 makes no assumption regarding STB placement and master/slave addresses. Any slave STB can be connected to any output connector of the bridge, while a master STB may be connected to any output connector of the bridge.

Bridge 50 includes a microprocessor or the like 66 that, along with regulator 68, regulates or controls the functionality and includes the necessary buffers, components and/or the like to implement the principles of the present invention as set forth herein. The bridge 50 has an input port 54 for connection to or coupling with an LNB (e.g. LNB 24A) and an input port 56 for connection to or coupling with an LNB (e.g. LNB 24B). An output port 58 is provided for connection to or coupling with an STB (e.g. a master STB) while an output port 60 is provided for connection to or coupling with an STB (e.g. a slave STB). The input port 54 and output port 58 providing a one-to-one correspondence between a master STB and LNB A, while input port 56 and output port 60 providing a one-to-one correspondence between a slave STB and LNB B.

Essentially, circuitry/logic 64 includes a first section 70 that services communications to and from input port 54 and output port 58, and a second section 72 that services communications to and from input port 56 and output port 60. The microprocessor 66 provides intercommunication for between STBs. First section 70 includes a DiSEqC-2 22 kHz transceiver (Tx/Rx) 76 for receiving DiSEqC communications from the master STB and repeating, forwarding or transmitting DiSEqC communications to the microprocessor 66 and the master STB. A DiSEqC-1 22 kHz transmitter (Tx) 74 is provided for repeating, forwarding or transmitting a DiSEqC communication to the LNB via port 54. Likewise, second section 72 includes a DiSEqC-2 22 kHz transceiver (Tx/Rx) 80 for receiving DiSEqC communications from the slave STB and repeating, forwarding or transmitting DiSEqC communications to the microprocessor 66 and the lave STB. A DiSEqC-1 22 kHz transmitter (Tx) 78 is provided for repeating, forwarding or transmitting a DiSEqC communication to the LNB via port 56.

First circuit 70 defines a loop having a low-pass filter (LPF) 84, a band saw filter (BSF) or LPF 85, a summer 82 and a high-pass filter (HPF) 83. An incoming DiSEqC communication from the master STB on the port 58 is provided to the LPF 84, which provides the necessary component(s) thereof to the BSF or LPF 85, while the DiSEqC component is provided to the appropriate mailbox by the microprocessor 66 by the DiSEqC transceiver 76. If the command needs to be repeated to the LNB (not for just an STB or the bridge mailbox), the DiSEqC transmitter 74 provides the command to the summer 82 for combining with the signal from BSF/LPF 85. The command is then provided to the port 54 for transmission to the LNB. An incoming DiSEqC reply from the LNB via port 54 is provided directly to the STB via port 58 through high-pass filter (HPF) 83.

Likewise, second circuit 72 defines a loop having a low-pass filter (LPF) 88, a band saw filter (BSF) or LPF 88, a summer 88 and a high-pass filter (HPF) 87. An incoming DiSEqC communication from the slave STB on the port 60 is provided to the LPF 88, which provides the necessary component(s) thereof to the BSF or LPF 89, while the DiSEqC component is provided to the appropriate mailbox by the microprocessor 66 by the DiSEqC transceiver 80. If the command needs to be repeated to the LNB (not for just an STB or the bridge mailbox), the DiSEqC transmitter 78 provides the command to the summer 86 for combining with the signal from BSF/LPF 89. The command is then provided to the port 56 for transmission to the LNB. An incoming DiSEqC reply from the LNB via port 56 is provided directly to the STB via port 60 through high-pass filter (HPF) 87.

The microprocessor 66 may be a digital signal processor or the like but in any case uses memory and/or buffers for creating, maintaining, manipulating and using the bridge mailbox and the STB mailboxes. Bridge 50 is thus configured, adapted and/or operable to receive commands embedded into the vendor extension portion of the DiSEqC protocol from an STB and provide those commands to an appropriate DiSEqC-compatible device including the bridge in order to implement same. Bridge 50 is further configured, adapted and/or operable to receive DiSEqC data or otherwise from the LNBs and the slave STB. It should be appreciated that a bridge may accommodate more than two one-to-one couplings and two STB-to-STB pairing.

Figure 3:
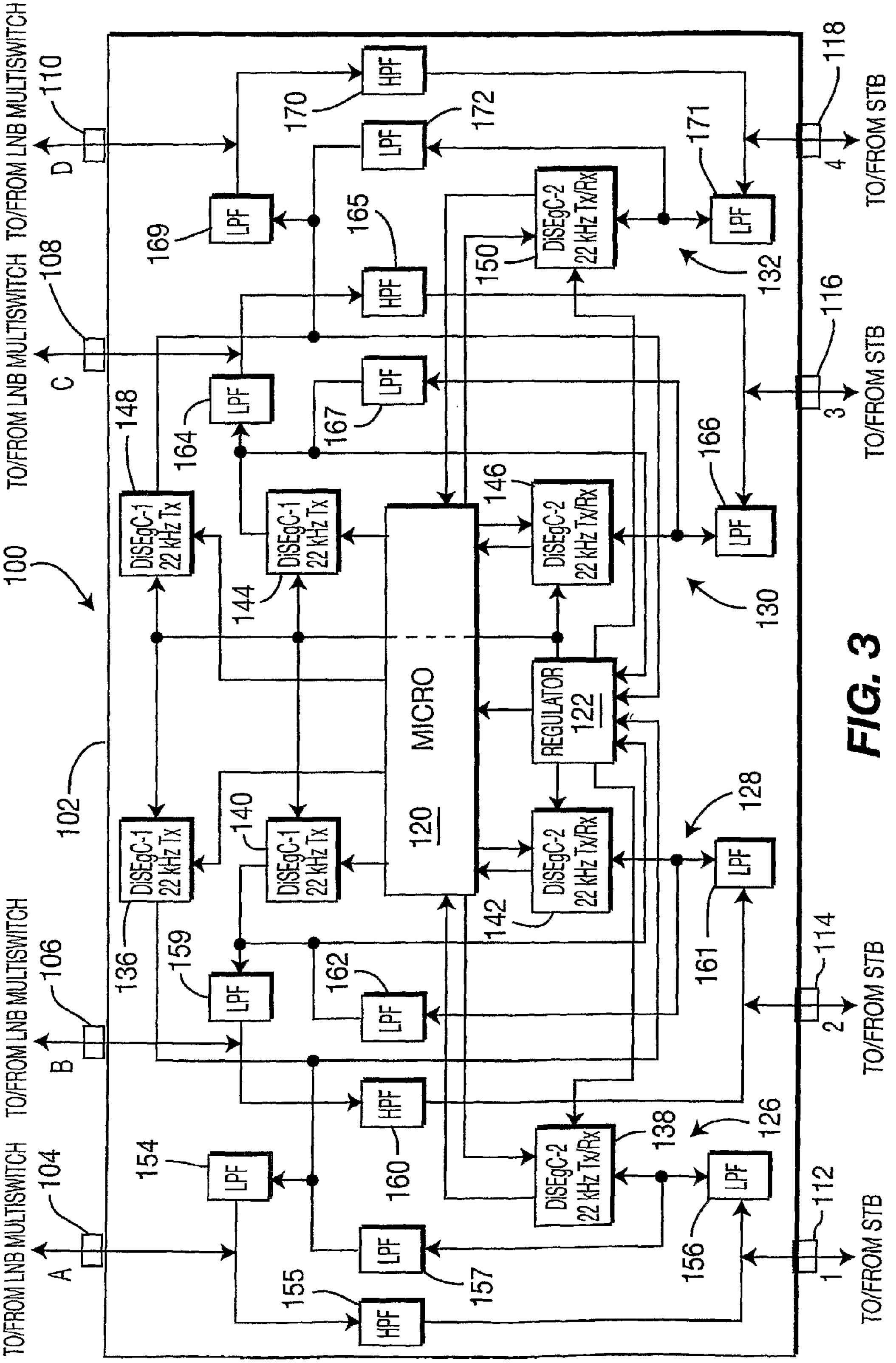
FIG. 3 is a block diagram of an exemplary embodiment of a 4×4 or four channel communication device or bridge for a video distribution system in accordance with the principles of the present invention.

As such, attention is directed to FIG. 3 wherein there is depicted an exemplary four-channel or four-by-four (4×4) pairing bridge (bridge), generally designated 100 for use with up to four STBs and four LNBs/multi-switches or the like, and as described herein wherein the STBs and the accessories (LNBs/multi-switches or the like) are DiSEqC compatible or utilize the DiSEqC communication protocol. The bridge 100 has a housing 102 enclosing processing circuitry/logic 64 as well as other components. The bridge 100 is designed to connect to four STBs and four LNBs/multi-switches. The bridge 100 makes no assumption regarding STB placement and master/slave addresses. Any slave STB can be connected to any output connector of the bridge, while a master STB may be connected to any output connector of the bridge.

Bridge 100 includes a microprocessor or the like 120 that, along with regulator 122, regulates or controls the functionality and includes the necessary buffers, components and/or the like to implement the principles of the present invention as set forth herein. The bridge 100 has an input port 104 for connection to or coupling with an LNB, an input port 106 for connection to or coupling with an LNB, another input port 108 for connection to or coupling with an LNB, and a further input port 110 for connection to or coupling with an LNB. An output port 112 is provided for connection to or coupling with an STB (e.g. a master STB), an output port 114 is provided for connection to or coupling with an STB (e.g. a slave STB), another output port 116 is provided for connection to or coupling with an STB (e.g. a slave STB), and a further output port 118 for connection to or coupling with an STB (e.g. a slave STB). The input port 104 and output port 112 providing a one-to-one correspondence between a master STB and an LNB, the input port 106 and output port 114 providing a one-to-one correspondence between a slave STB and an LNB, the input port 108 and output port 116 providing a one-to-one correspondence between a slave STB and an LNB, and the input port 110 and output port 118 providing a one-to-one correspondence between a slave STB and an LNB.

Essentially, circuitry/logic 124 includes a first section 126 that services communications to and from input port 104 and output port 112, a second section 128 that services communications to and from input port 106 and output port 114, a third section 130 that services communications to and from input port 108 and output port 116, and a fourth section 132 that services communications to and from input port 110 and output port 118. The microprocessor 120 provides intercommunication for between STBs.

First section 128 includes a DiSEqC-2 22 kHz transceiver (Tx/Rx) 138 for receiving DiSEqC communications from the master STB and repeating, forwarding or transmitting DiSEqC communications to the microprocessor 120 and the master STB. A DiSEqC-1 22 kHz transmitter (Tx) 136 is provided for repeating, forwarding or transmitting a DiSEqC communication to the LNB via port 104. Likewise, second section 128 includes a DiSEqC-2 22 kHz transceiver (Tx/Rx) 142 for receiving DiSEqC communications from the slave STB and repeating, forwarding or transmitting DiSEqC communications to the microprocessor 120 and the slave STB. A DiSEqC-1 22 kHz transmitter (Tx) 140 is provided for repeating, forwarding or transmitting a DiSEqC communication to the LNB via port 106. Likewise, third section 130 includes a DiSEqC-2 22 kHz transceiver (Tx/Rx) 146 for receiving DiSEqC communications from the slave STB and repeating, forwarding or transmitting DiSEqC communications to the microprocessor 120 and the slave STB. A DiSEqC-1 22 kHz transmitter (Tx) 144 is provided for repeating, forwarding or transmitting a DiSEqC communication to the LNB via port 108. Likewise, fourth section 132 includes a DiSEqC-2 22 kHz transceiver (Tx/Rx) 150 for receiving DiSEqC communications from the slave STB and repeating, forwarding or transmitting DiSEqC communications to the microprocessor 120 and the slave STB. A DiSEqC-1 22 kHz transmitter (Tx) 148 is provided for repeating, forwarding or transmitting a DiSEqC communication to the LNB via port 110.

First circuit 126 defines a loop having a low-pass filter (LPF) 156, an LPF 157, an LPF (summer) 154 and a high-pass filter (HPF) 155. An incoming DiSEqC communication from the master STB on the port 112 is provided to the LPF 156, which provides the necessary component(s) thereof to the LPF 157, while the DiSEqC component is provided to the appropriate mailbox by the microprocessor 120 by the DiSEqC transceiver 138. If the command needs to be repeated to the LNB (not for just an STB or the bridge mailbox), the DiSEqC transmitter 136 provides the command to the LPF 154 for combining with the signal from LPF 157. The command is then provided to the port 104 for transmission to the LNB. An incoming DiSEqC reply from the LNB via port 104 is provided directly to the STB via port 112 through high-pass filter (HPF) 155.

Likewise, second circuit 128 defines a loop having a low-pass filter (LPF) 161, an LPF 162, an LPF (summer) 159 and a high-pass filter (HPF) 160. An incoming DiSEqC communication from the master STB on the port 114 is provided to the LPF 161, which provides the necessary component(s) thereof to the LPF 162, while the DiSEqC component is provided to the appropriate mailbox by the microprocessor 120 by the DiSEqC transceiver 142. If the command needs to be repeated to the LNB (not for just an STB or the bridge mailbox), the DiSEqC transmitter 140 provides the command to the LPF 159 for combining with the signal from LPF 162. The command is then provided to the port 106 for transmission to the LNB. An incoming DiSEqC reply from the LNB via port 106 is provided directly to the STB via port 114 through high-pass filter (HPF) 160.

Likewise, third circuit 130 defines a loop having a low-pass filter (LPF) 166, an LPF 167, an LPF (summer) 164 and a high-pass filter (HPF) 165. An incoming DiSEqC communication from the master STB on the port 116 is provided to the LPF 166, which provides the necessary component(s) thereof to the LPF 167, while the DiSEqC component is provided to the appropriate mailbox by the microprocessor 120 by the DiSEqC transceiver 146. If the command needs to be repeated to the LNB (not for just an STB or the bridge mailbox), the DiSEqC transmitter 144 provides the command to the LPF 164 for combining with the signal from LPF 167. The command is then provided to the port 108 for transmission to the LNB. An incoming DiSEqC reply from the LNB via port 108 is provided directly to the STB via port 116 through high-pass filter (HPF) 165.

Likewise, fourth circuit 132 defines a loop having a low-pass filter (LPF) 171, an LPF 172, an LPF (summer) 169 and a high-pass filter (HPF) 170. An incoming DiSEqC communication from the master STB on the port 118 is provided to the LPF 171, which provides the necessary component(s) thereof to the LPF 172, while the DiSEqC component is provided to the appropriate mailbox by the microprocessor 120 by the DiSEqC transceiver 150. If the command needs to be repeated to the LNB (not for just an STB or the bridge mailbox), the DiSEqC transmitter 148 provides the command to the LPF 169 for combining with the signal from LPF 172. The command is then provided to the port 110 for transmission to the LNB. An incoming DiSEqC reply from the LNB via port 110 is provided directly to the STB via port 118 through high-pass filter (HPF) 170.

The microprocessor 120 may be a digital signal processor or the like but in any case has internal memory and/or buffers for creating, maintaining, manipulating and using the bridge mailbox and the STB mailboxes. Bridge 100 is thus configured, adapted and/or operable to receive commands embedded into the vendor extension portion of the DiSEqC protocol from an STB and provide those commands to an appropriate DiSEqC-compatible device including the bridge in order to implement same. Bridge 100 is further configured, adapted and/or operable to receive DiSEqC data or otherwise from the LNBs and the slave STBs.

The present invention permits DiSEqC communication between DiSEqC master devices such as STBs in a video distribution system. This is accomplished through use of vendor extensions that are allowed in DiSEqC. With inter-STB communication, as provided by the present invention new, more sophisticated features for multi-STB applications are available. For example, STBs may cooperate to enforce STB pairing to prevent an STB purchased by one consumer to be given to another consumer and thus be used at a different location.

The DiSEqC-compatible bridge is connected between STBs and their associated Low Noise Block down-converter (LNB). This DiSEqC-compatible bridge incorporates extensions to the DiSEqC definition to permit a DiSEqC "master" per output port. Each STB is connected using coaxial cable to an output port of this DiSEqC-compatible bridge. The bridge will permit a DiSEqC master to send DiSEqC commands through the bridge to the associated input port from the LNB. Thus, each DiSEqC master can still control the operation of its associated DBS reception devices such as LNBs and amplifiers.

In summation, the DiSEqC-compatible bridge includes a microprocessor, processor, controller, processing logic, means or the like, a 22 kHz transceiver on each output, either a 22 kHz transmitter or a transceiver on each input port and memory or digital storage. With a 22 kHz transmitter, the bridge will permits DiSEqC 1.x operation to the DBS reception devices, i.e., one-way DiSEqC communication to those devices. With a 22 kHz transceiver, the bridge will permit DiSEqC 2.x operation to the DBS reception devices, i.e., two-way DiSEqC communication with those devices. As a further extension, the DiSEqC-compatible bridge could accept DiSEqC vendor extension commands to permit a STB to control the reception devices normally associated with another STB.

The present invention provides one-to-one pairing of STBs to accessory devices (LNBs, multi-switches, etc.) while allowing inter-STB communication. With this inter-STB communication, a STB vendor can provide new, more sophisticated features for multi-STB applications in a location. For example, the STBs could cooperate to enforce STB "pairing" to prevent a STB purchased by one consumer to be given to another consumer and used in a different location.

A DiSEqC-compatible bridge device is disposed between the STBs and their associated Low Noise Block down-converter (LNB). This DiSEqC-compatible bridge incorporates extensions to the DiSEqC definition to permit a DiSEqC "master" per output port of a multi-output port bridge device. Each STB is connected using coaxial cable to an output port of the DiSEqC-compatible bridge. The bridge permits a DiSEqC master to send DiSEqC commands through the bridge to the associated input port from the LNB. Thus, each DiSEqC master can still control the operation of its associated DBS reception devices, such as an LNB, amplifier, multi-switch or the like.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

What is claimed is:

1. An apparatus comprising:
- a first plurality of input/output ports;
- a second plurality of input/output ports;
- a communication protocol transceiver associated with each one of the first plurality of input/output ports;
- a communication protocol transmitter associated with each one of the second plurality of input/output ports; and
- a controller in communication with each communication protocol transmitter and each communication protocol transceiver, the controller providing communication between the first plurality of input/output ports and the second plurality of input/output ports, and intercommunication between the first plurality of input/output ports, wherein the controller defines a mailbox for each one of the first plurality of input/output ports, and wherein each of said mailboxes is associated with an associated input/output port and is configured to store communication protocol commands and communication protocol data for forwarding to said associated input/output port in response to a request received at said associated input/output port.

2. The apparatus of claim 1, wherein the second plurality of input/output ports are configured for connection with controllable video reception devices comprising one of an amplifier, an LNB and a multi-switch.

3. The apparatus of claim 1, wherein the communication protocol transceivers comprise DiSEqC communication protocol transceivers and the communication protocol transmitters comprise DiSEqC communication protocol transmitters.

4. A connection device for a video distribution system, the connection device comprising:
- a plurality of input ports each one of which is configured to connect to and provide communication with a video reception device;
- a plurality of output ports each one of which is configured to connect to and provide communication with a set top box;
- a video distribution system communication protocol transmitter associated with each one of the plurality of input ports;
- a video distribution system communication protocol transceiver associated with each one of the plurality of output ports; and
- a controller in communication with each video distribution system communication protocol transmitter and each video distribution system communication protocol transceiver, for providing i) one to one communication between the output ports and the input ports, and ii) two-way communication between the output ports, and iii) providing a mailbox for at least one of the output ports wherein said mailbox is configured to store communication protocol commands and communication protocol data for forwarding to said at least one of the output ports, wherein said stored communication protocol commands and communication protocol data is forwarded in response to a request received from said at least one of the output ports.

5. The connection device of claim 4, wherein the plurality of input ports are configured to connect to and provide communication with a video reception device comprising one of an amplifier, an LNB and a multi-switch.

6. The connection device of claim 4, wherein the video distribution system communication protocol transceivers comprise DiSEqC compatible transceivers and the video distribution system communication protocol transmitters comprise DiSEqC compatible transmitters.

7. A method of communicating between a first set top box and a second set top box in a video distribution system comprising the steps of:
- allocating a plurality of memory locations configured to store communication protocol commands and communication protocol data related to each of a plurality of set top boxes;
- receiving a first communication from the first set top box with a first transceiver;
- transmitting a portion of said first communication to a processing means wherein said processing means stores said portion of said first communication in one of said plurality of memory locations;
- receiving a second communication from a second set top box with a second transceiver; and
- transmitting a portion of said second communication to said processing means wherein said processing means transmits said portion of said first communication to said second set top box in response to said portion of said second communication.

8. The method of claim 7, wherein each set top box may only communicate with another set top box on the video distribution system by initiating the communication.

9. The method of claim 7, wherein the first and second transceivers comprise DiSEqC compatible transceivers.

* * * * *